United States Patent
Itou et al.

(10) Patent No.: US 10,001,680 B2
(45) Date of Patent: Jun. 19, 2018

(54) LIQUID CRYSTAL DISPLAY DEVICE

(71) Applicant: Japan Display Inc., Tokyo (JP)

(72) Inventors: Osamu Itou, Tokyo (JP); Takato Hiratsuka, Tokyo (JP); Toshimasa Ishigaki, Tokyo (JP); Daisuke Sonoda, Tokyo (JP)

(73) Assignee: Japan Display Inc., Tokyo (JP)

( * ) Notice: Subject to any disclaimer, the term of this patent is extended or adjusted under 35 U.S.C. 154(b) by 822 days.

(21) Appl. No.: 14/532,047

(22) Filed: Nov. 4, 2014

(65) Prior Publication Data

US 2015/0124207 A1    May 7, 2015

(30) Foreign Application Priority Data

Nov. 6, 2013  (JP) ................................. 2013-230509

(51) Int. Cl.
*G02F 1/1343* (2006.01)
*G02F 1/1337* (2006.01)

(52) U.S. Cl.
CPC .. G02F 1/134363 (2013.01); G02F 1/133753 (2013.01); *G02F 2001/133757* (2013.01)

(58) Field of Classification Search
CPC ......... G02F 1/136286; G02F 1/133707; G02F 1/134363; G02F 1/133753; G02F 2001/133757

USPC .......................................................... 349/139
See application file for complete search history.

(56) References Cited

U.S. PATENT DOCUMENTS

| | | | |
|---|---|---|---|
| 5,852,485 A | 12/1998 | Shimada et al. | |
| 2012/0293763 A1* | 11/2012 | Inoue | G02F 1/133788 349/178 |
| 2013/0057792 A1* | 3/2013 | Shimada | G02F 1/133753 349/42 |

FOREIGN PATENT DOCUMENTS

JP           9-258265 A      10/1997

* cited by examiner

*Primary Examiner* — Nathanael R Briggs
*Assistant Examiner* — William Peterson
(74) *Attorney, Agent, or Firm* — Typha IP LLC

(57) ABSTRACT

In an LCD device having wall electrodes, four kinds of pixels are used that impart different alignment properties to the liquid crystal molecules. Specifically, the LC molecules are aligned such that: the LC molecules in first pixels twist clockwise and rise in a plus direction; the LC molecules in second pixels twist clockwise and rise in a minus direction; the LC molecules in third pixels twist counterclockwise and rise in the plus direction; and the LC molecules in fourth pixels twist counterclockwise and rise in the minus direction. The pixels of the same type are arranged in rows such that their long sides are adjacent to one another.

12 Claims, 15 Drawing Sheets

F I G . 8
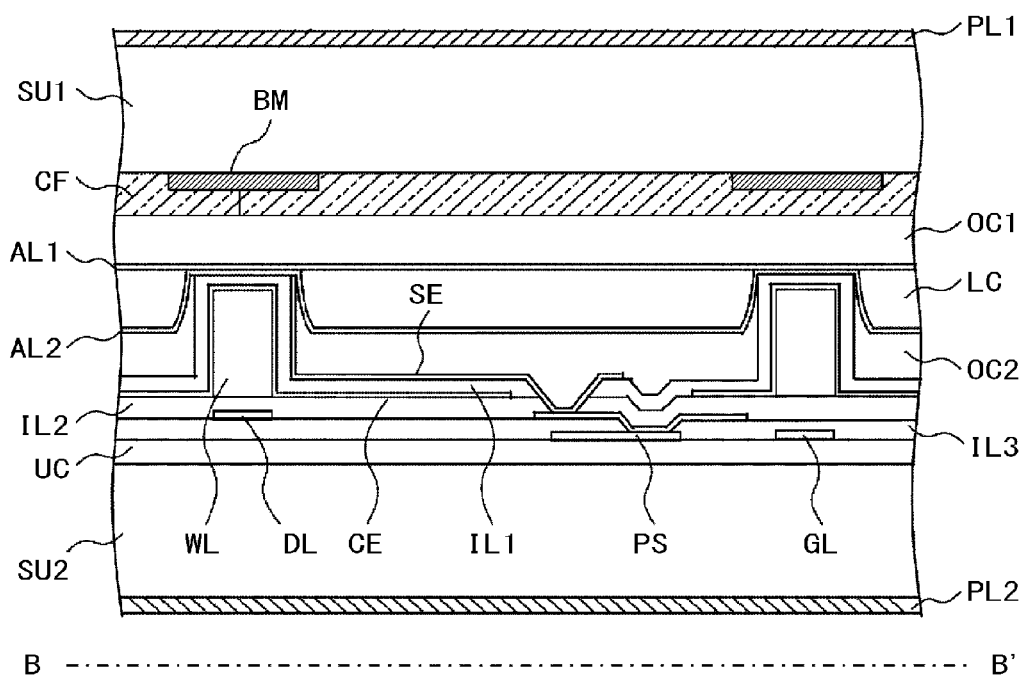

POLAR ANGLE (DEGREES)

POLAR ANGLE (DEGREES)

POLAR ANGLE (DEGREES)

POLAR ANGLE (DEGREES)

LIQUID CRYSTAL DISPLAY DEVICE

CLAIM OF PRIORITY

The present application claims priority from Japanese patent application JP2013-230509 filed on Nov. 6, 2013, the content of which is hereby incorporated by reference into this application.

BACKGROUND

The present invention relates to liquid crystal display devices and is applicable, for example, to a liquid crystal display device having wall electrodes.

A liquid crystal display (LCD) device is a non-luminescent display that shows images by controlling transmissive light from a light source. The main features of LCDs include thinness, light weight, and low power consumption. At present, in-plane switching (IPS) can be given as an example of liquid crystal display schemes that achieve wide viewing angles. An IPS LCD includes source electrodes and a common electrode on a TFT substrate, and application of a lateral electric field to each pixel causes the liquid crystal molecules to rotate in an in-plane direction. This in turn causes the effective optical axis to rotate in one plane, whereby transmittance can be controlled.

JP-1997-258265-A discloses an LCD device that aims to achieve a sufficient aperture ratio, reduce inter-wiring noise signals, and apply to the liquid crystal layer uniform lateral electric fields that are almost completely parallel to the substrate surface. In the above LCD device, drain electrodes and opposite electrodes protrude into the liquid crystal layer to apply electric fields to the liquid crystal layer.

SUMMARY

As described below, the present inventors have found problems with the electrode structure of IPS LCDs.

An electrode that has substantially the same height as the thickness of a liquid crystal layer and protrudes into the layer is hereinafter referred to as a wall electrode. In an IPS LCD with such wall electrodes, electric fields are applied parallel to the entire liquid crystal layer. Thus, the transmittance of such an IPS LCD is higher than that of a conventional IPS LCD in which planner electrodes are used to apply lateral electric fields only to the bottom section of the liquid crystal layer.

However, with a high-aperture-ratio pixel structure of an IPS LCD having wall electrodes, viewing angle characteristics are compromised.

Other problems to be solved by the present invention as well as its novel features will be understood from the following disclosure and the attached drawings.

The representative feature of the present invention can be summarized as follows.

In an LCD device having wall electrodes, four kinds of pixels are used that impart different alignment properties to the liquid crystal molecules. Specifically, the LC molecules are aligned such that: the LC molecules in first pixels twist clockwise and rise in a plus direction; the LC molecules in second pixels twist clockwise and rise in a minus direction; the LC molecules in third pixels twist counterclockwise and rise in the plus direction; and the LC molecules in fourth pixels twist counterclockwise and rise in the minus direction. The pixels of the same type are arranged in rows such that their long sides are adjacent to one another.

The above LCD device can achieve wide viewing angles, a high transmittance rate, and a high contrast ratio at the same time.

BRIEF DESCRIPTION OF THE DRAWINGS

FIG. 8 is a cross section taken along line B-B' of FIG. 2, 3, 4, 5, or 12;

DESCRIPTION OF THE PREFERRED EMBODIMENTS

The pixel structure of an IPS LCD having wall electrodes can take various forms, but consideration of aperture ratio, storage capacitor formation, structural simplicity, and other factors will eventually lead to an optimal structure. For instance, a wall electrode itself, being a non-aperture section, is disposed below a black matrix at a pixel boundary to maintain the aperture ratio. Also, if two source electrodes for two pixels are disposed on the two wall surfaces of a wall electrode, a slit needs to be provided on the top of the wall electrode to separate the two source electrodes. In that case, the width of the wall electrode is determined on the basis of the addition of the tolerance of layer alignment and the tolerance of slit fabrication; thus, the width of the wall electrode exceeds that of a black matrix.

To prevent this exceeding, a common electrode can be formed across the two wall surfaces of the wall electrode, and a source electrode can be formed only on one wall surface. In this case, the width of the wall electrode is determined only by the tolerance of layer alignment and will not exceed the width of the black matrix. To block off the effect of the electric potential of wiring, the common electrode can completely cover the planar sections between wall electrodes, and the source electrode can extend from one wall surface of a wall electrode to a planar section. An example of this structure (hereinafter referred to as Comparative Example 1) is described below.

Figure 4:
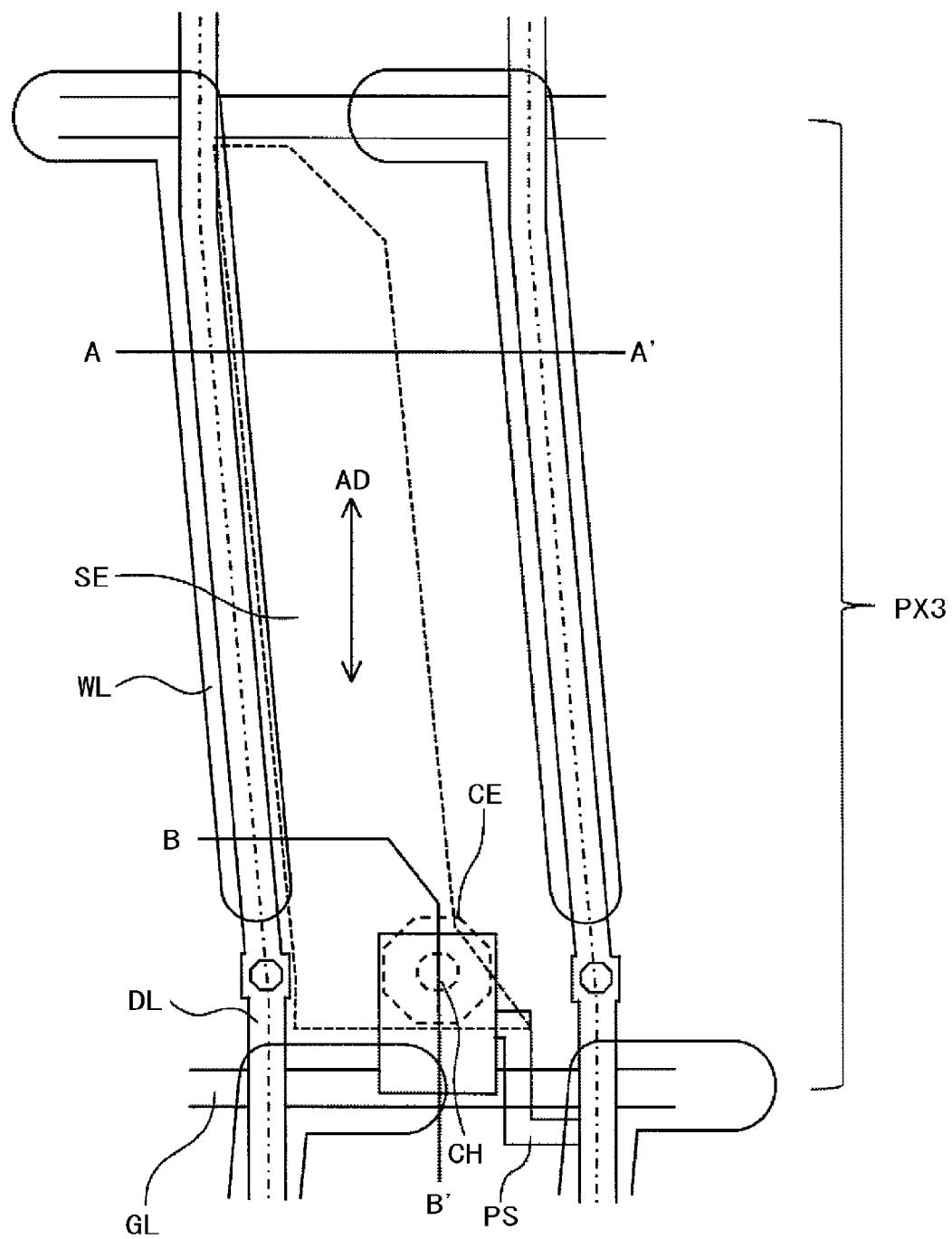
FIG. 4 is an enlarged view of one of the third pixels of FIG. 1.
Figure 5:
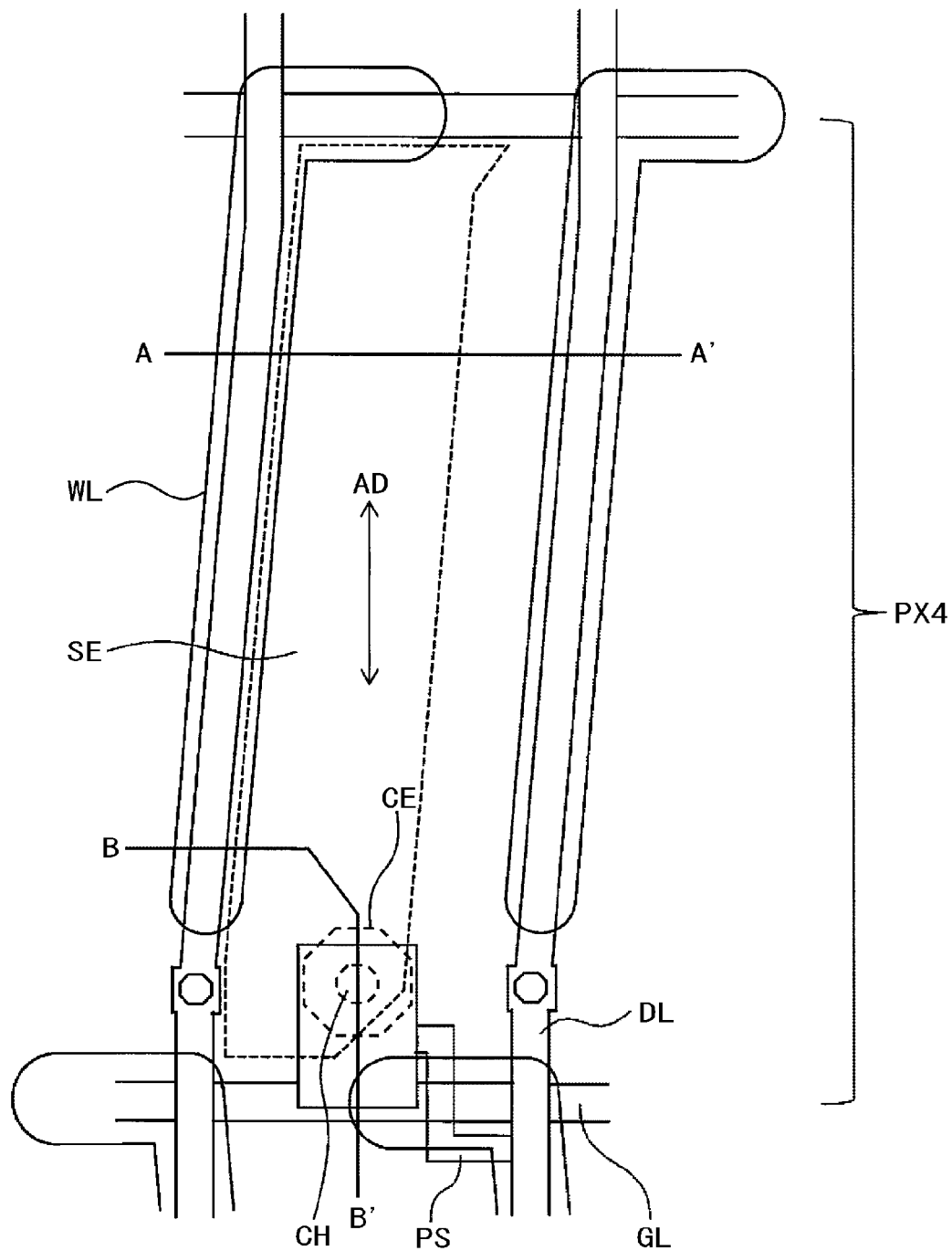
FIG. 5 is an enlarged view of one of the fourth pixels of FIG. 1.
Figure 7:
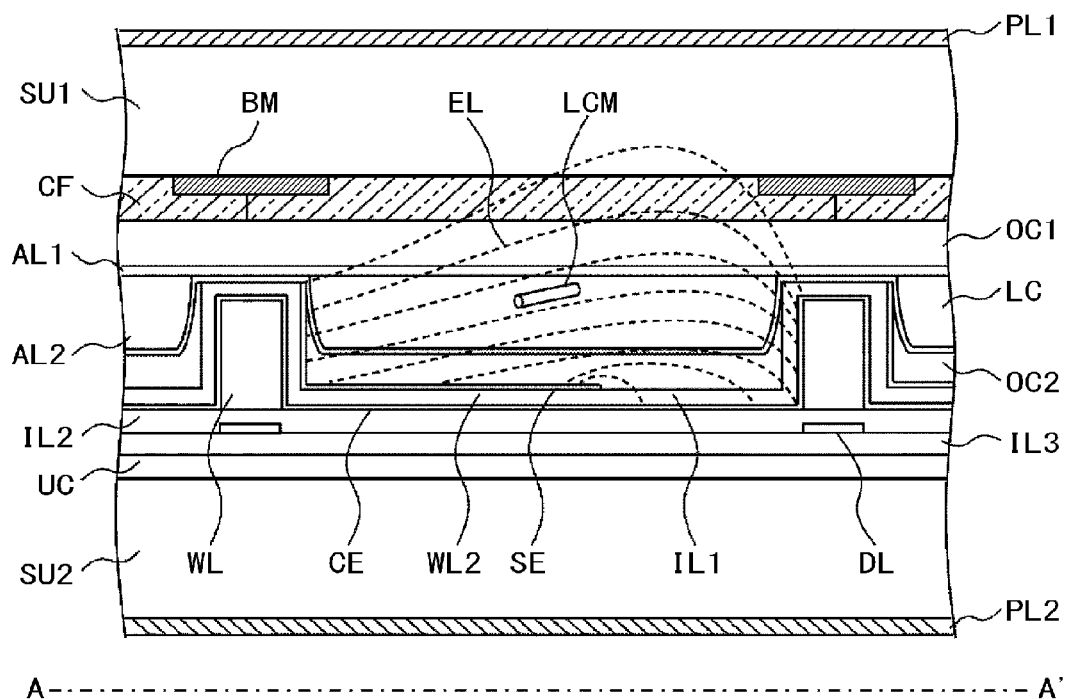
FIG. 7 is a cross section taken along line A-A' of FIG. 4, 5, or 12.
Figure 12:
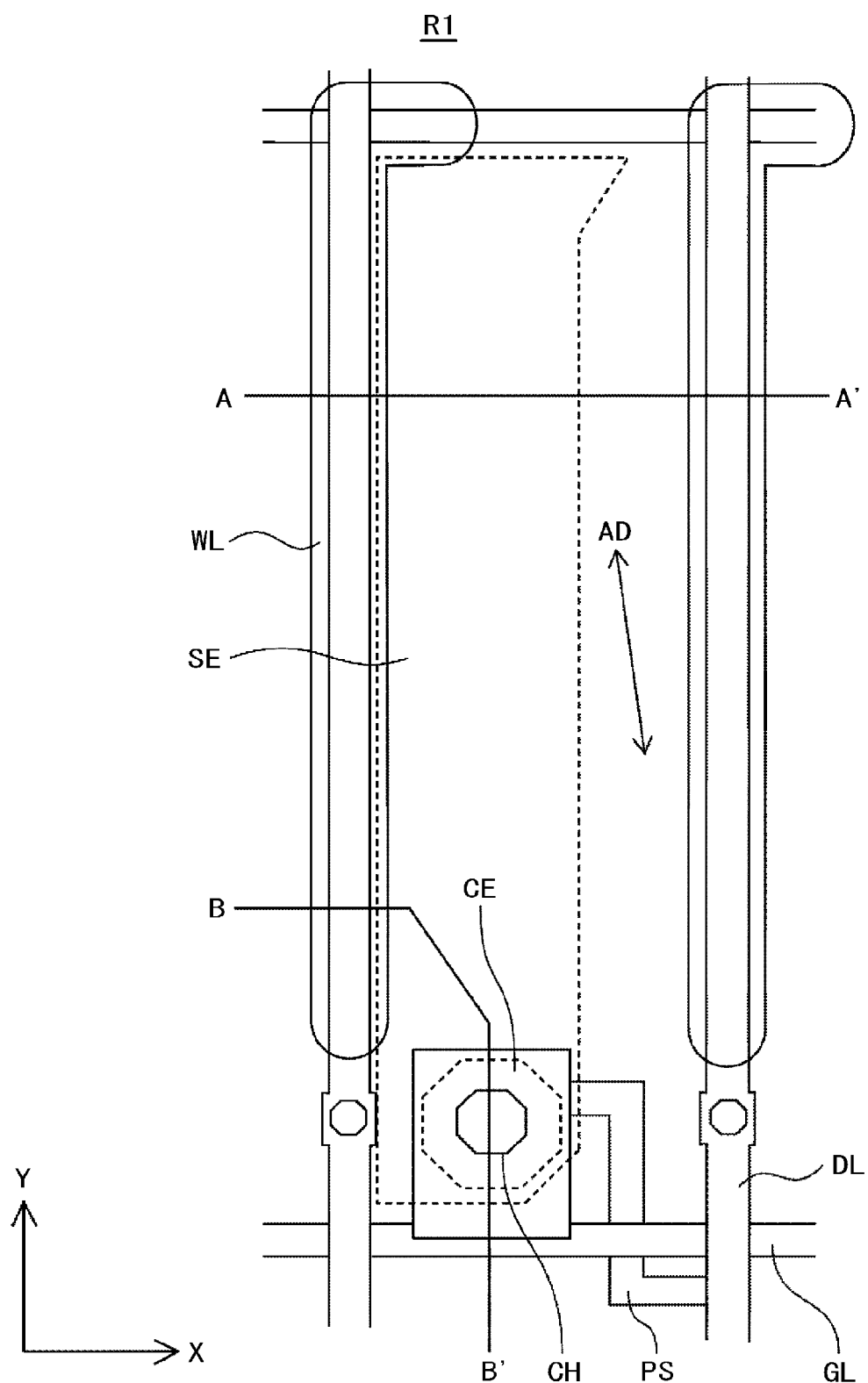
FIG. 12 is a plan view of a pixel of an LCD device according to Comparative Example 1.
Figure 13A:
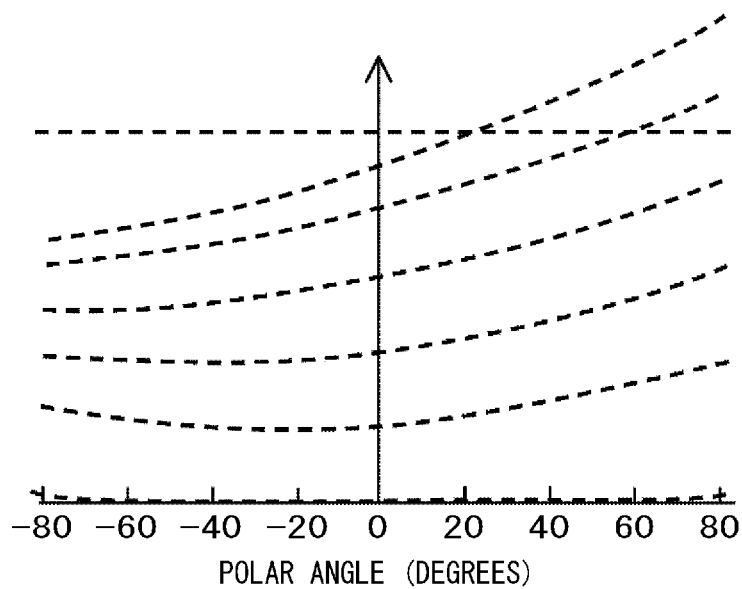
FIGS. 13A and 13B illustrate the results of the measurement of viewing angle characteristics on a tone-by-tone basis according to Comparative Example 1.
Figure 13B:
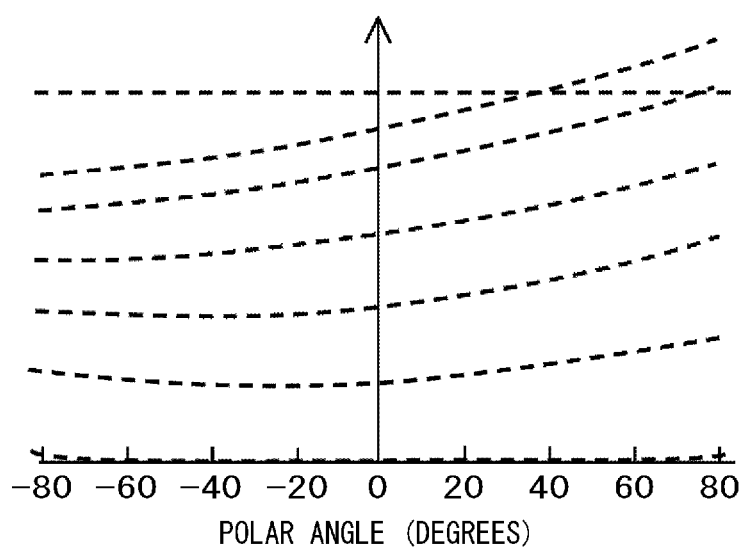

FIG. 12 is a plan view of a pixel of an LCD device R1 according to Comparative Example 1. FIG. 7 is a cross section taken along line A-A' of FIG. 12 while FIG. 8 is a cross section taken along line B-B' of FIG. 12. FIGS. 13A and 13B illustrate the results of the measurement of viewing angle characteristics on a tone-by-tone basis according to Comparative Example 1. Note that the A-A' cross section of FIG. 7 can also be obtained from FIG. 4 or 5 while the B-B' cross section of FIG. 8 can also be obtained from FIG. 2, 3, 4, or 5.

As illustrated in FIG. 12, a pixel of the LCD device R1 of Comparative Example 1 is rectangular in plan view, and all the pixels of the LCD device R1 are of the same type as that shown in FIG. 12. The LCD device R1 includes a first substrate SU1 and a second substrate SU2 with a liquid crystal layer LC placed therebetween. Laminated structures on the first substrate SU1 include, from the liquid crystal layer side, a first alignment film AL1, a first overcoat OC1, a color filter CF, and black matrices BM. The color filter CF includes red, green, and blue color filters, each of which is strip-shaped and arranged to cover one pixel. Laminated structures on the second substrate SU2 include the following components from the liquid crystal layer side: a second alignment film AL2, a second overcoat OC2, source electrodes SE, a first insulating film IL1, a common electrode CE, wall structures WL, a second insulating film IL2, data lines DL, a third insulating film IL3, gate lines GL, a polysilicon layer PS, and an undercoat UC.

The dashed lines of FIG. 12 represent the outlines of a source electrode SE and the common electrode CE. Because the common electrode CE extends across the entire surface of FIG. 12 except the contact hole CH, the dashed outline of the common electrode CE is present only around the contract hole CH. As illustrated in FIG. 7, the wall structures WL extend into the liquid crystal layer LC, and the common electrode CE extends over the wall structures WL and across the flat spaces between the wall structures WL. Each of the source electrodes SE, on the other hand, extends over one wall surface of a wall structure WL and across part of the flat space between the wall structure WL and an adjacent wall structure WL. The common electrode CE and the source electrodes SE are laminated together with the first insulating film IL1 placed therebetween, and the laminated portions function as storage capacitors. As stated above, the common electrode CE extends not only over the wall structures WL but also across the spaces between the wall structures WL; thus, it is capable of blocking off the effect of the electric potential of adjacent pixels and wiring.

Each of the source electrodes SE is connected to a data line DL via the polysilicon layer PS and a contact hole CH, and a voltage is applied to the liquid crystal layer LC based on an image signal. The common electrode CE has an opening around each contact hole CH to prevent a short circuit with the source electrodes SE. The dashed lines of FIG. 7 represent electric force lines EL formed between a source electrode SE and the common electrode CE. The electric force lines EL extend so as to connect the source electrode SE on one wall surface of a wall structure WL and the common electrode CE on one wall surface of an opposite wall structure WL.

When the edge of the source electrode SE lies at the exact center of the space between the two opposing wall structures WL, the density of the electric force lines becomes non-uniform. In that case, a uniform electric field cannot be applied to the liquid crystal layer LC, leading to low transmittance. In other words, due to the effect of the interface potential outside the first substrate SU1, the distribution of an equipotential plane within the pixel is skewed toward the source electrode SE side, that is, dense on the source electrode SE side and sparse on the common electrode side. To achieve a uniform density of electric force lines, then, the source electrode SE needs to further extend farther toward the opposite side than the pixel center. This extension will lead to higher transmittance, but at the same time be accompanied with that, within the liquid crystal layer LC, the electric force lines EL become slightly slanted with respect to a layer surface of the liquid crystal layer LC. Specifically, the electric force lines EL become slanted as if to rise toward the wall structure WL at which the common electrode CE is exposed. As illustrated in FIG. 7, the wall structure at which the common electrode CE is exposed lies on the right side of FIG. 7, and the electric force lines EL are thus slanted as if to rise rightward. Therefore, it is necessary to impart to liquid crystal molecules LCM a tilt angle that causes the molecules LCM to rise rightward (i.e., a plus-directional tilt angle).

Using the LCD device R1 of Comparative Example 1, we examined the dependence of the luminance of tones on polar angles. The tones were selected at which luminance was 20, 40, 60, 80, and 90% for the display of the black and white colors and for white-color display in the normal direction, and luminance measurement was conducted in the horizontal direction (X direction) and in the vertical direction (Y direction) of FIG. 12. FIGS. 13A and 13B illustrate the resultant viewing angle characteristics. How to read the graphs of FIGS. 13A and 13B as well as 9A and 9B will be described later in detail. As illustrated, the plotted curves of each tone are bilaterally asymmetrical, and on one side, some of the curves partially intersect with the plotted line. This intersection corresponds to the direction in which the liquid crystal molecules rise. As a result, tone inversion was observed in which middle tones gained more luminance than the white color on the side where the LC molecules LCM rose.

Although the above optimized pixel structure is advantageous in that it is structurally simpler and has a high aperture ratio, using pixels of only one type for an LCD device compromises viewing angle characteristics. Specifically, tone inversion could occur in high polar angle areas when high tones are displayed.

As stated above, the LCD device R1 of Comparative Example 1 has the drawback of having a skewed tilt-angle distribution.

Embodiment

In an LCD device having wall electrodes, four kinds of pixels are used that impart different alignment properties to the LC molecules. Specifically, the LC molecules are aligned such that: the LC molecules in first pixels twist clockwise and rise in a plus direction; the LC molecules in second pixels twist clockwise and rise in a minus direction; the LC molecules in third pixels twist counterclockwise and rise in the plus direction; and the LC molecules in fourth pixels twist counterclockwise and rise in the minus direction. The pixels of the same type are arranged in rows such that their long sides are adjacent to one another.

With IPS LCDs having wall electrodes, an optimized pixel structure can have a skewed tilt-angle distribution. Thus, viewing angle characteristics are effected not only by the rotational directions of the LC molecules but also by the directions in which the LC molecules rise. The LC molecules twist clockwise or counterclockwise. Also, the LC molecules rise to the right or the left as viewed when the pixel is placed with its long sides parallel to a vertical direction, and for the sake of convenience, these rise directions (right and left) are hereinafter called the plus direction and the minus direction, respectively. There are four combinations of these twist directions (clockwise or counterclockwise) and rise directions (plus or minus). Thus, the use of four kinds of pixels in combination can offset differences in viewing angle characteristics resulting from clockwise and counterclockwise twists and those resulting from plus-directional and minus-directional rises. As a consequence, viewing angle characteristics can be improved.

The four kinds of pixels can be arranged in various ways, but one of the features of an optimized pixel structure is that a source electrode is disposed on only one wall surface of a wall structure. To arrange the four kinds of pixels while keeping this feature intact, the pixels of the same type can be arranged in rows such that their long sides are adjacent to one another. This arrangement reduces the width of wall structures, achieves a high aperture ratio, and consequently improves viewing angle characteristics.

In accordance with the present embodiment, the four kinds of pixels are arranged while the aperture ratio is maintained. Therefore, wide viewing angles, a high transmittance rate, and a high contrast ratio can be achieved at the same time. With small- to medium-sized IPS LCDs with high resolution, viewing angle characteristics can be improved while transmittance is kept high. IPS LCDs with wall electrodes are advantageous in that AC- and DC-induced image persistence occurs in small areas; thus, they are suitable for medical displays in which image persistence is easy to notice. Thus, in accordance with the present embodiment, the transmittance and viewing angle characteristics of a medical display can be improved.

Example 1

Figure 1:
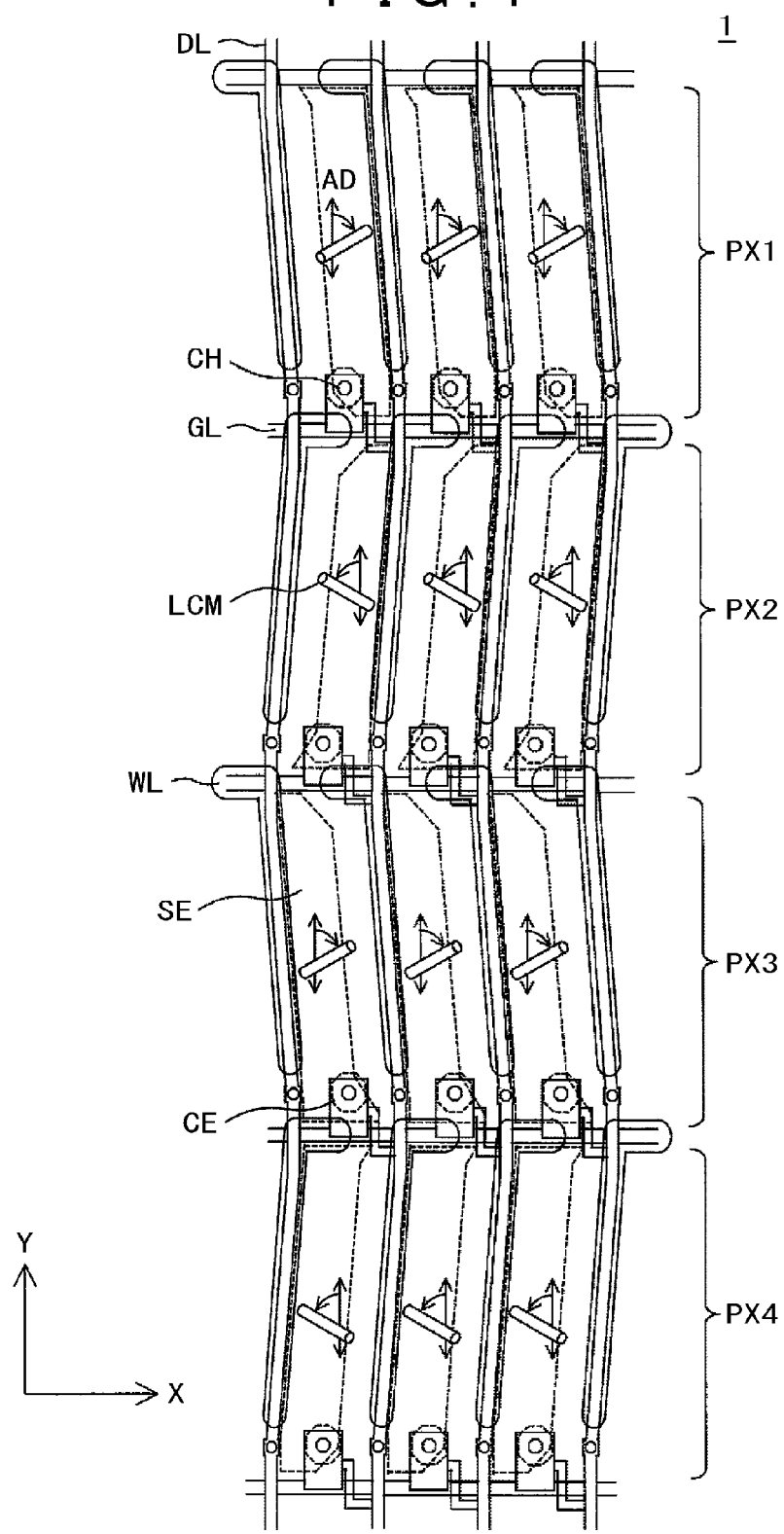
FIG. 1 is a plan view of twelve pixels of an LCD device according to Example 1 of the invention.
Figure 2:
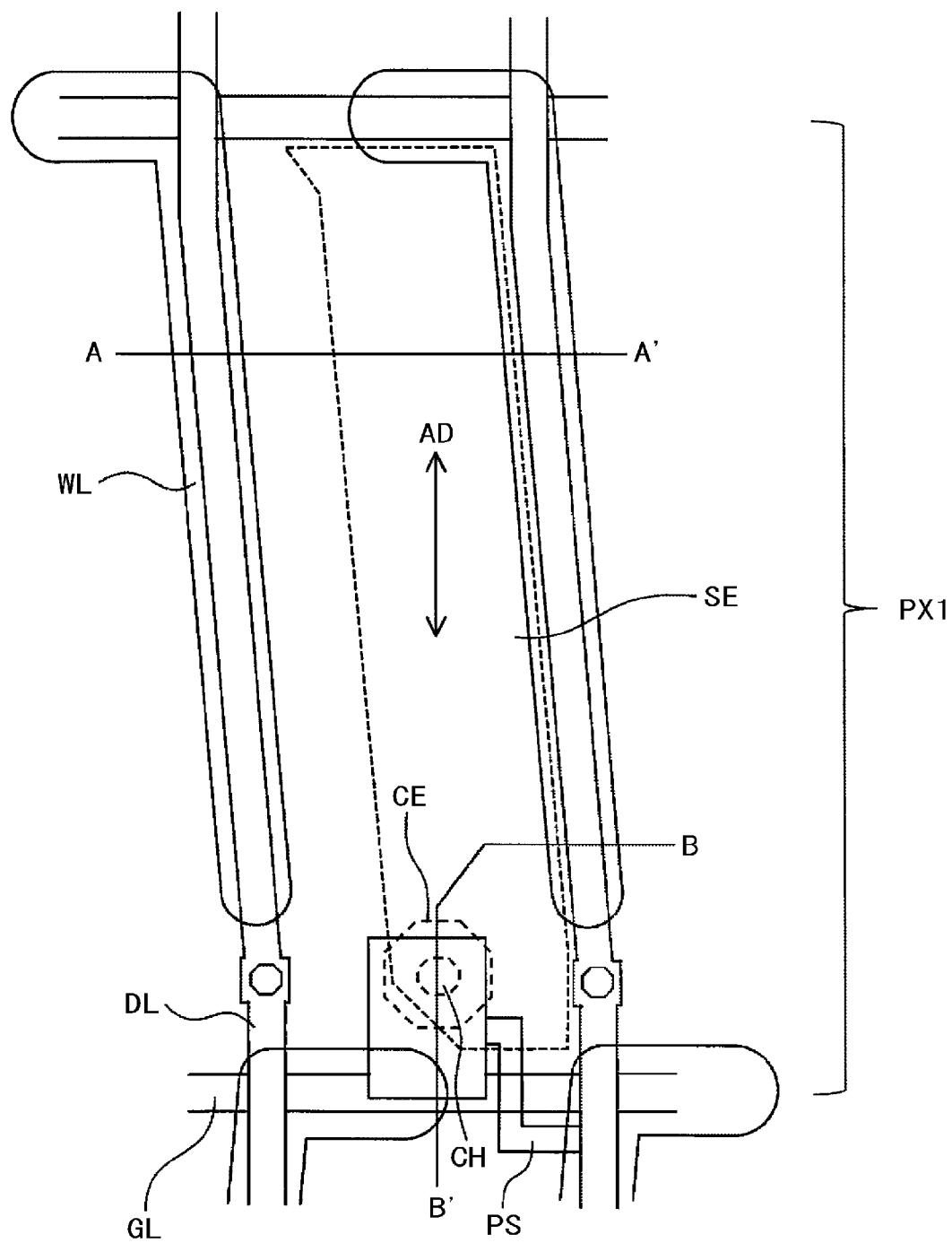
FIG. 2 is an enlarged view of one of the first pixels of FIG. 1.
Figure 3:
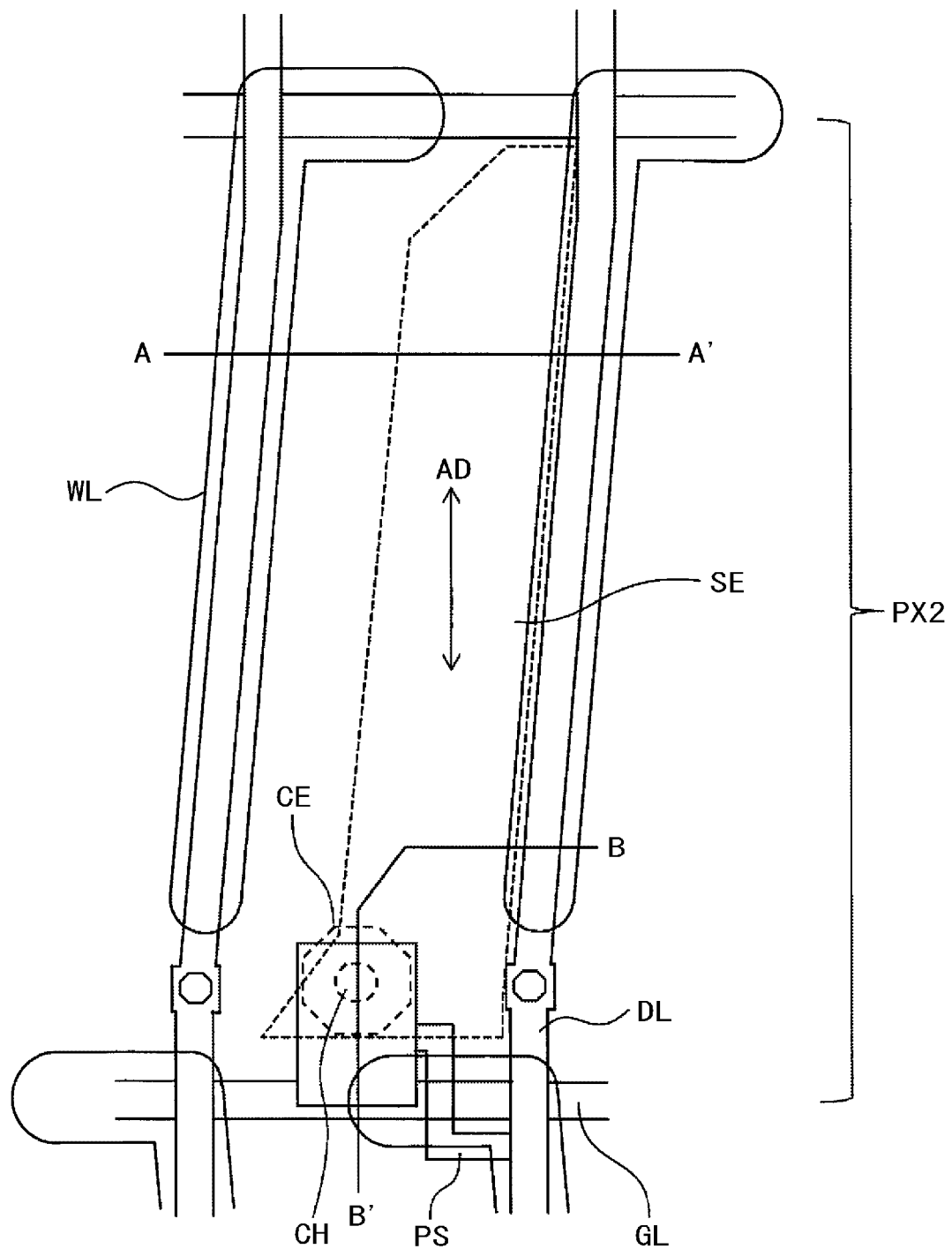
FIG. 3 is an enlarged view of one of the second pixels of FIG. 1.

FIG. 1 is a plan view of twelve pixels of an LCD device 1 according to Example 1. The twelve pixels of FIG. 1, arranged in three columns and four rows, include four types of pixels. The pixels of the same type are arranged in a row (X direction) such that their long sides are adjacent to one another. As illustrated in FIG. 1, the pixels arranged in the top row, upper middle row, lower middle low, and bottom row are hereinafter referred to as first pixels PX1, second pixels PX2, third pixels PX3, and fourth pixels PX4, respectively. The straight arrows of FIG. 1 each represent the alignment treatment direction AD within a pixel while the cylinders represent the alignment directions of LC molecules LCM. Further, the arc-shaped arrows connecting the straight arrows and the cylinders schematically represent changes in the alignment of the LC molecules resulting from voltage application, and the LC molecules LCM of FIG. 1 are in an aligned state with a voltage being applied. When an LC molecule LCM rises to the right of FIG. 1, it is called a plus-directional rise. Conversely, when the molecule LCM rises to the left of FIG. 1, it is called a minus-directional rise. As illustrated, the LC molecules in the first pixels PX1 twist clockwise and rise in the minus direction; the LC molecules in the second pixels PX2 twist counterclockwise and rise in the minus direction; the LC molecules in the third pixels PX3 twist clockwise and rise in the plus direction; and the LC molecules in the fourth pixels PX4 twist counterclockwise and rise in the plus direction.

Figure 6:
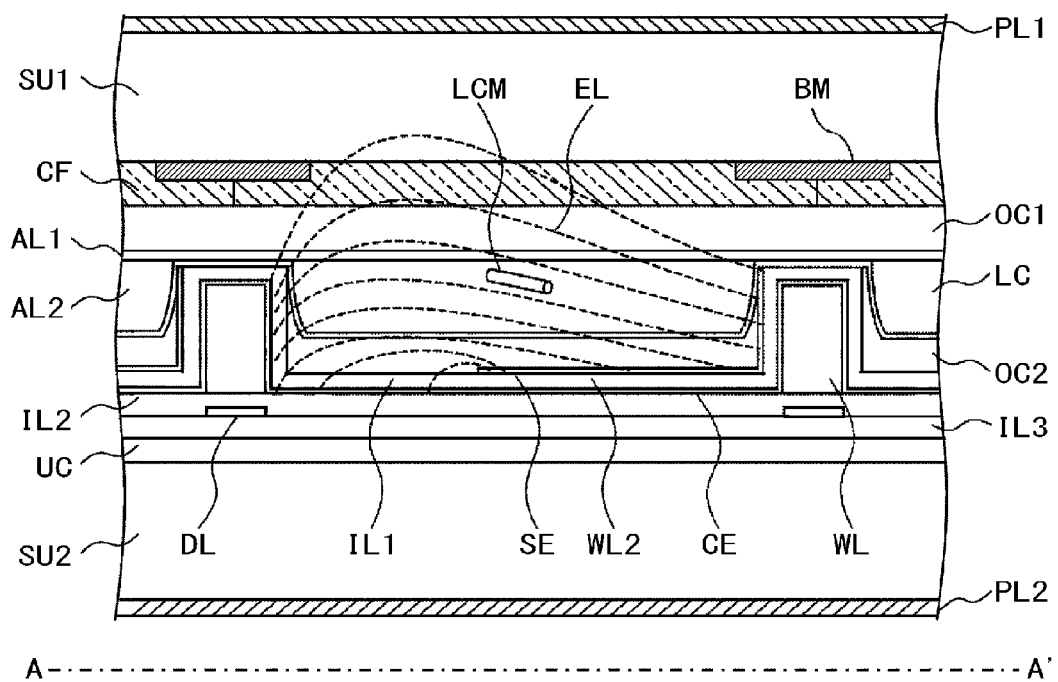
FIG. 6 is a cross section taken along line A-A' of FIG. 2 or 3.

FIGS. 2, 3, 4, and 5 are enlarged views of a first pixel PX1, a second pixel PX2, a third pixel PX3, and a fourth pixel PX4, respectively. FIG. 6 is a cross section taken along line A-A' of FIG. 2 or 3 (first or second pixel) while FIG. 7 is a cross section taken along line A-A° of FIG. 4 or 5 (third or fourth pixel). Further, FIG. 8 is a cross section taken along line B-B' of FIG. 2, 3, 4, or 5 (first, second, third, or fourth pixel). As illustrated in the figures, the LCD device 1 of Example 1 includes a first substrate SU1 and a second substrate SU2 with a liquid crystal layer LC placed therebetween. Laminated structures on the first substrate SU1 include, from the liquid crystal layer side, a first alignment film AL1, a first overcoat OC1, a color filter CF, and black matrices BM. The color filter CF includes red, green, and blue color filters, each of which is strip-shaped and arranged to cover one pixel. Laminated structures on the second substrate SU2 include the following components from the liquid crystal layer side: a second alignment film AL2, a second overcoat OC2, source electrodes SE, a first insulating film IL1, a common electrode CE, wall structures WL, a second insulating film IL2, data lines DL, a third insulating film IL3, gate lines GL, a polysilicon layer PS, and an undercoat UC.

The dashed lines of FIGS. 1 through 5 represent the outlines of the source electrodes SE and the common electrode CE. Since the common electrode CE extends across the entire surfaces of FIGS. 1 through 5 except the contact holes CH, the dashed outline of the common electrode CE is present only around the contract holes CH. As illustrated in FIGS. 6 and 7, the wall structures WL extend into the liquid crystal layer LC, and the common electrode CE extends over the wall structures WL and across the flat spaces between the wall structures WL. Each of the source electrodes SE, meanwhile, extends over one wall surface of a wall structure WL and across part of the flat space between the wall structure WL and an adjacent wall structure WL. The common electrode CE and the source electrodes SE are laminated together with the first insulating film IL1 placed therebetween, and the laminated portions serve as storage capacitors. As stated above, the common electrode CE extends not only over the wall structures WL but also across the spaces between the wall structures WL; thus, it is capable of blocking off the effect of the electric potential of adjacent pixels and wiring.

Each of the source electrodes SE is connected to a data line DL via the polysilicon layer PS and a contact hole CH, and a voltage is applied to the liquid crystal layer LC based on an image signal. The common electrode CE has an opening around each contact hole CH to prevent a short circuit with the source electrodes SE. The dashed lines of FIGS. 6 and 7 represent electric force lines EL formed between a source electrode SE and the common electrode CE. The electric force lines EL extend so as to connect the source electrode SE on one wall surface of a wall structure WL and the common electrode CE on one wall surface of an opposite wall structure WL.

When the edge of the source electrode SE lies at the exact center of the space between the two opposing wall structures WL, the density of the electric force lines becomes non-uniform. In that case, a uniform electric field cannot be applied to the liquid crystal layer LC, leading to low transmittance. In other words, due to the effect of the interface potential outside the first substrate SU1, the distribution of an equipotential plane within the pixel is skewed toward the source electrode SE side, that is, dense on the source electrode SE side and sparse on the common electrode side. To achieve a uniform density of electric force lines, then, the source electrode SE needs to further extend farther toward the opposite side from the pixel center. This extension will lead to higher transmittance, but at the same time be accompanied with that, within the liquid crystal layer LC, the electric force lines EL become slightly slanted with respect to a layer surface of the liquid crystal layer LC. Specifically, the electric force lines EL is slanted as if to rise toward the wall structure WL at which the common electrode CE is exposed. In FIG. 6 illustrating a first pixel PX1 or a second pixel PX2, the wall structure at which the common electrode CE is exposed lies on the left side of FIG. 6, and the electric force lines EL are thus slanted as if to rise leftward. Thus, the LC molecules LCM within the first and second pixels are imparted with a tilt angle that causes the LC molecules LCM to rise leftward (i.e., a minus-directional tilt angle). By contrast, in FIG. 7 illustrating a third pixel PX3 and a fourth pixel PX4, the wall structure at which the common electrode CE is exposed lies on the right side of FIG. 7, and the electric force lines EL are thus slanted as if to rise rightward. Thus, the LC molecules LCM within the third and fourth pixels are imparted with a tilt angle that causes the molecules LCM to rise rightward (i.e., a plus-directional tilt angle).

The liquid crystal layer LC exhibits a nematic phase within a wide temperature range including a room temperature. When no voltage is applied to the liquid crystal layer LC, the LC molecules are homogeneously aligned. On the contrary, application of an electric field causes the liquid crystal director to change as if to rotate within the liquid crystal layer. In a conventional IPS LCD with a planar common electrode and source electrodes, electric fields are locally present at the bottom of the liquid crystal layer LC. By contrast, the LCD device 1 of Example 1 allows application of more uniform electric fields to the liquid crystal layer LC, whereby higher transmittance can be achieved. The liquid crystal layer LC is not present at the places where the wall structures WL are present, the place constituting non-aperture sections. Also, the wall structures WL are formed mainly at pixel boundary sections, which are light-blocked by the black matrices BM. Therefore, the presence of the wall structures WL hardly reduces the aperture ratio. The first alignment film AL1 and the second alignment film AL2 are photo-alignment films, and a photo-alignment method is employed for their alignment treatment. After being applied onto the wall structures WL, the second alignment film AL2 is subjected to non-contact alignment treatment with the use of polarized ultraviolet light.

As illustrated in FIG. 1, each of the wall structures WL is substantially L-shaped in plan view, and the wall structure WL of one pixel is disconnected and separated from those of adjacent pixels. At the time the liquid crystal layer LC is formed, such an arrangement allows liquid crystal molecules LCM to flow along the spaces between the wall structures WL. Thus, the separate arrangement of the wall structures WL enables easy formation of the liquid crystal layer LC.

One of the features of an optimized pixel structure is that a source electrode is disposed on only one wall surface of a wall structure. In this case, the width of the wall structure is determined only by the tolerance of layer alignment and thus does not exceed the width of a black matrix. To arrange the four kinds of pixels, PX1, PX2, PX3, and PX4, while keeping this feature intact, the pixels of the same type, as illustrated in FIG. 1, can be arranged in rows such that their long sides are adjacent to one another. This arrangement reduces the width of the wall structures, achieves a high aperture ratio, and consequently improves viewing angle characteristics.

Figure 10:
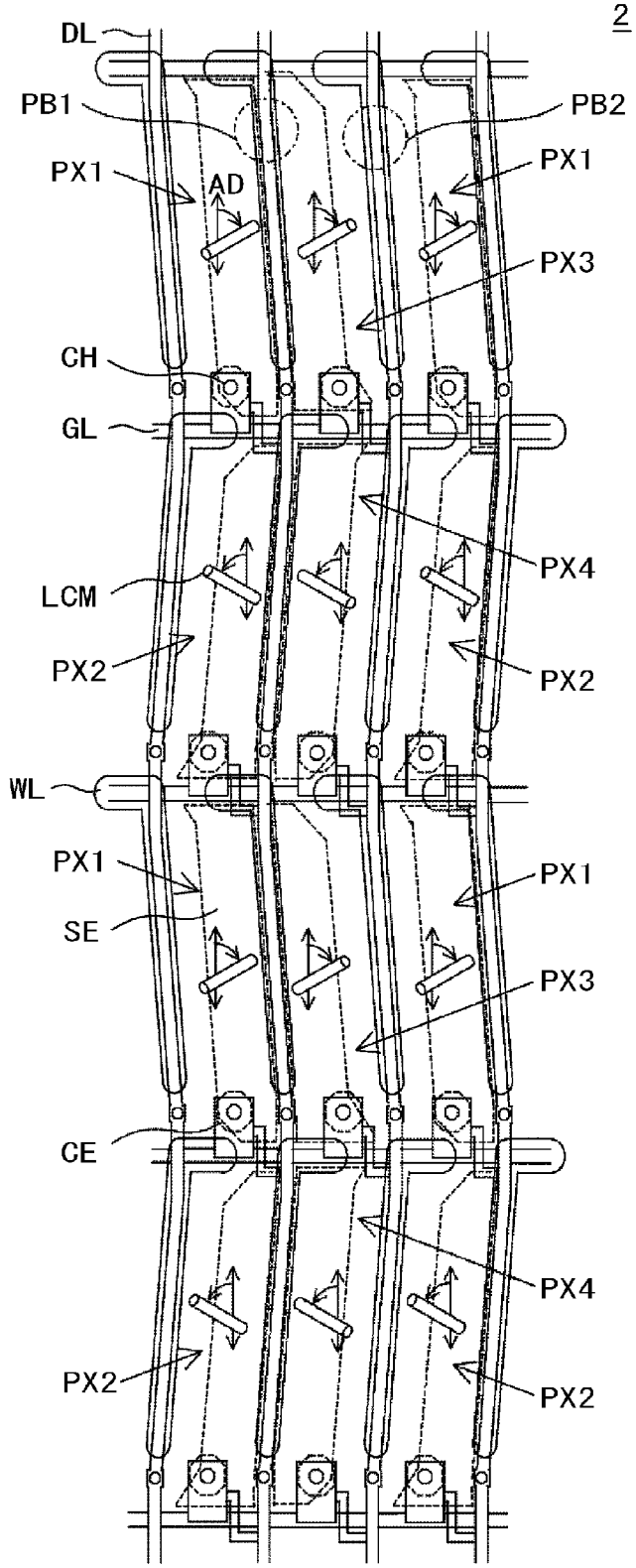
FIG. 10 is a plan view of twelve pixels of an LCD device according to Example 2 of the invention.

FIG. 10 illustrates another possible arrangement of the first pixels PX1, second pixels PX2, third pixels PX3, and fourth pixels PX4 in which the first pixels PX1 and the third pixels PX3 are alternately arranged in rows (FIG. 10 pertains to Example 2 described later). In this case, wall structures WL each having two source electrodes SE on its two wall surfaces illustrated by the area PB1 of FIG. 10 alternate with wall structures WL having no source electrodes SE on their two wall surfaces illustrated by the area PB2 of FIG. 10. The width of the former wall structures WL with source electrodes SE is determined by the addition of the tolerance of wall structure alignment and the tolerance of slit fabrication and thus exceeds the width of the black matrices BM. In contrast, the width of the latter wall structures WL without source electrodes SE is determined only by the tolerance of wall structure fabrication and thus substantially the same as that of wall structures WL each having only one source electrode SE on its one wall surface. As a result, the aperture ratio is reduced compared with the row-directional arrangement of pixels of the same type.

When a single domain controller unit DC is disposed on a pixel boundary on a short side of a pixel, a contact hole CH will need to be provided between two opposing wall electrodes. At this time, electric force lines can be formed over the contact hole and the nearby areas thereof, thereby driving liquid crystal molecules around the contact hole. Thus, in accordance with Example 1, the effective aperture ratio of an LCD device can be improved as well.

A domain is an area that exhibits the liquid crystal rotational direction opposite to the rotational direction of those liquid crystal molecules LCM located at the center of a pixel when a voltage is applied. When a domain occurs at the edge of a pixel, the clockwise liquid crystal rotation is balanced by the counterclockwise liquid crystal rotation, causing the pixel to have areas where no alignment changes occur. Such areas with no alignment changes are observed as black lines and lead to reduced transmittance since the areas have the same alignment status as that occurring during black-color display. Thus, the domain controller unit DC is used to prevent such domain occurrence, thereby improving transmittance.

Figure 9A:
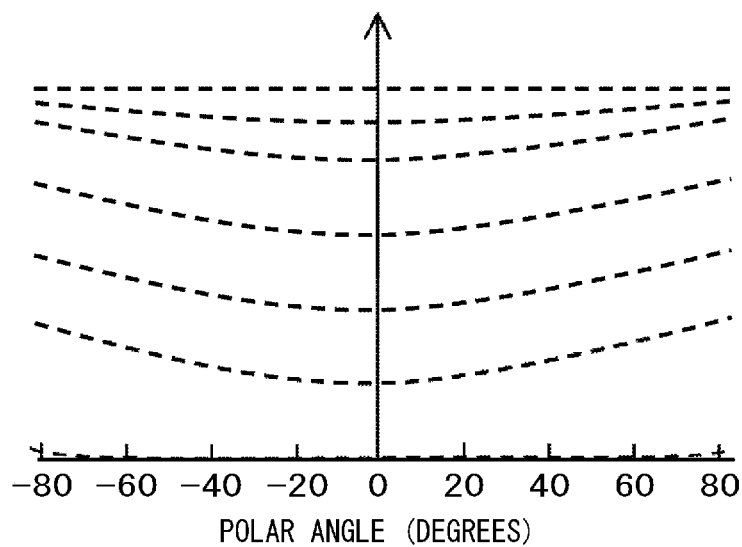
FIGS. 9A and 9B illustrate the results of the measurement of viewing angle characteristics on a tone-by-tone basis according to Example 1.
Figure 9B:
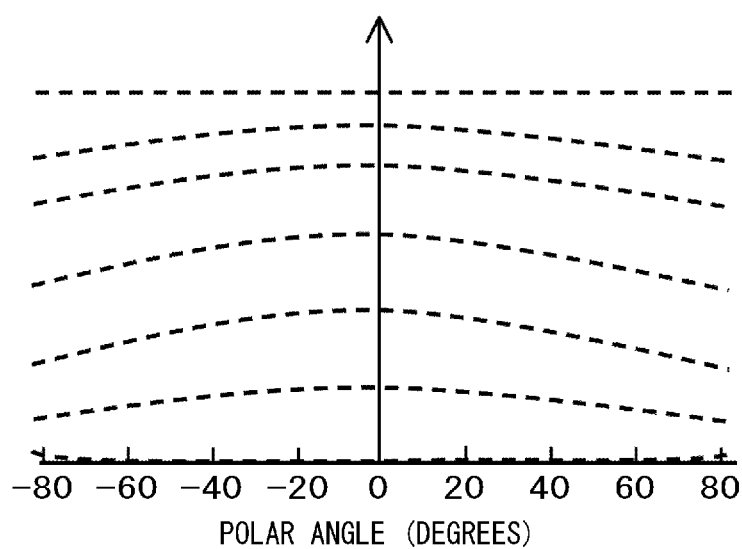

FIGS. 9A and 9B illustrate the results of the measurement of viewing angle characteristics on a tone-by-tone basis according to Example 1. To evaluate the viewing angle characteristics, tones were selected at which luminance became 20, 40, 60, 80, and 90% for the display of the black and white colors and for white-color display in the normal direction, and measurement was conducted on an about 5-mm circular area, sufficiently larger than pixel size, that included substantially equal numbers of first pixels PX1, second pixels PX2, third pixels PX3, and fourth pixels PX4. The horizontal axes of FIGS. 9A and 9B represent polar angles, and an azimuth angle of 0 degrees was selected for FIG. 9A and an azimuth angle of 90 degrees for FIG. 9B. The 0-degree azimuth angle corresponds to the horizontal direction (X direction) of FIG. 1 while the 90-degree azimuth angle corresponds to the vertical direction (Y direction) of FIG. 1. The vertical axes of FIGS. 9A and 9B represent luminance, which is normalized by a luminance of 100% at each polar angle. The bottom dashed line at a polar angle of 0 degrees represents the luminance of the black color while the top dashed line represents the luminance of the white color. As can be seen, the plotted curve of each tone is bilaterally symmetrical in both of FIG. 9A and FIG. 9B. Also, no plotted curves intersect with one another at any polar angle, and there is no sign of tone inversion.

Comparative Example 2

Figure 14:
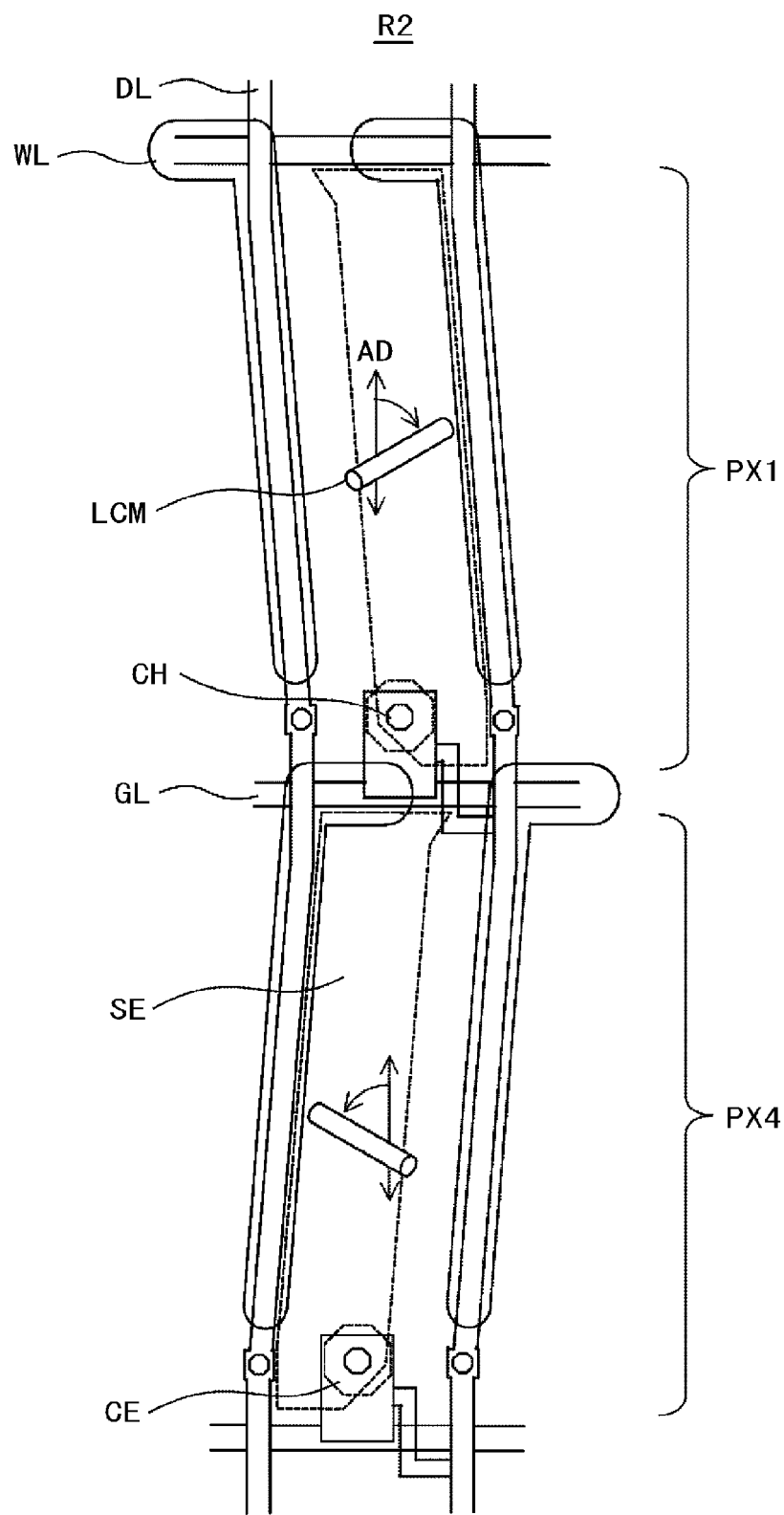
FIG. 14 is a plan view of two pixels of an LCD device according to Comparative Example 2.
Figure 15A:
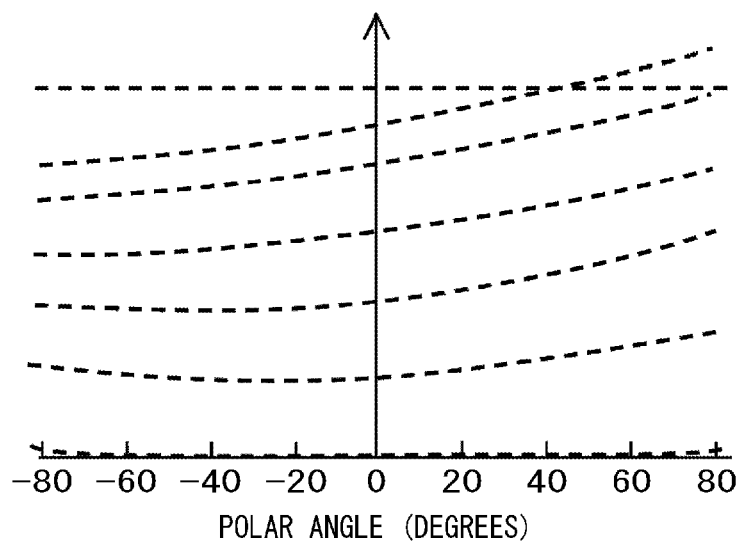
FIGS. 15A and 15B illustrate the results of the measurement of viewing angle characteristics on a tone-by-tone basis according to Comparative Example 2.
Figure 15B:
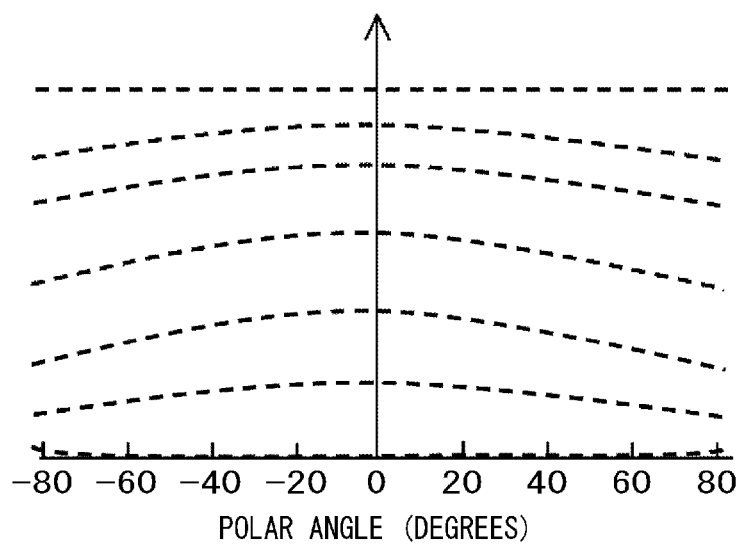

FIG. 14 is a plan view of two pixels of an LCD device R2 device according to Comparative Example 2. FIGS. 15A and 15B illustrate the results of the measurement of viewing angle characteristics on a tone-by-tone basis according to Comparative Example 2. The LCD device R2 of Comparative Example 2 includes two types of pixels: first pixels PX1 and fourth pixels PX4 used in Example 1. The two types of pixels are arranged as illustrated in FIG. 14. The LC molecules within the first pixel PX1 twist clockwise and rise in the minus direction while the LC molecules within the fourth pixels PX4 twist counterclockwise and rise in the plus direction. Thus, the LCD device R2 of Comparative Example 2 can have better viewing angle characteristics than the LCD device R1 of Comparative Example 1.

Using the LCD device R2 of Comparative Example 2, we examined the dependence of the luminance of tones on polar angles when the azimuth angle was 0 and 90 degrees. The tones were selected at which luminance became 20, 40, 60, 80, and 90% for the display of the black and white colors and for white-color display in the normal direction. FIGS. 15A and 15B illustrate the resultant viewing angle characteristics. As illustrated in FIG. 15B, when the azimuth angle is 90 degrees, the plotted curve of each tone is bilaterally symmetrical with no curves intersecting with one another, and no tone inversion was observed. However, in FIG. 15A in which the azimuth angle is 0 degrees, the plotted curves of each tone are bilaterally asymmetrical, and some of the curves partially intersect with the plotted line in the direction in which the LC molecules LCM rise. The interpretation of the graphs of FIGS. 15A and 15B is the same as in the foregoing FIGS. 9A and 9B.

As is obvious from the LC molecules LCM within the first pixel PX1 and fourth pixel PX4 shown in FIG. 14, the directions in which these molecules LCM rise at the time of voltage application do not differ by 180 degrees. This is due to the different pixel shapes of the first pixel PX1 and the fourth pixel PX4. As can be seen from the LC molecules LCM within the first pixels PX1, second pixels PX2, third pixels PX3, and fourth pixels PX4 of FIG. 1, pixel combinations in which the rising directions of the LC molecules LCM differ by 180 degrees are a combination of the first pixels PX1 and the third pixels PX3 and another combination of the second pixels PX2 and the fourth pixels PX4. Unless these four types of pixels are disposed, tone inversion cannot be completely prevented both at the 0-degree azimuth angle and the 90-degree azimuth angle.

Example 2

FIG. 10 is a plan view of twelve pixels of an LCD device 2 of Example 2. Similar to Example 1, the LCD device 2, as illustrated in FIG. 10, includes the four types of pixels, that is, first pixels PX1, second pixels PX2, third pixels PX3, and fourth pixels PX4, but the arrangement is different. In the first and third rows of FIG. 12, a first pixel PX1, a third pixel PX3, and a first pixel PX1 are arranged in the stated order from left to right. In the second and fourth rows of FIG. 12, from left to right, a second pixel PX2, a fourth pixel PX4, and a second pixel PX2 are arranged in the stated order. Because the first pixels PX1 and the third pixels PX3 have the same shape, they can be arranged with their long sides adjacent to one another. The same applies to the second pixels PX2 and the fourth pixels PX4.

Similar to Example 1, we examined the viewing angle characteristics on a tone-by-tone basis using the LCD device 2 of Example 2. Tones were selected at which luminance became 20, 40, 60, 80, and 90% for the display of the black and white colors and for white-color display in the normal direction. As a result, the same viewing angle characteristics as in FIGS. 9A and 9B were obtained, and it was confirmed that no tone inversion occurred in the LCD device 2 of Example 2 as well.

Figure 11A:
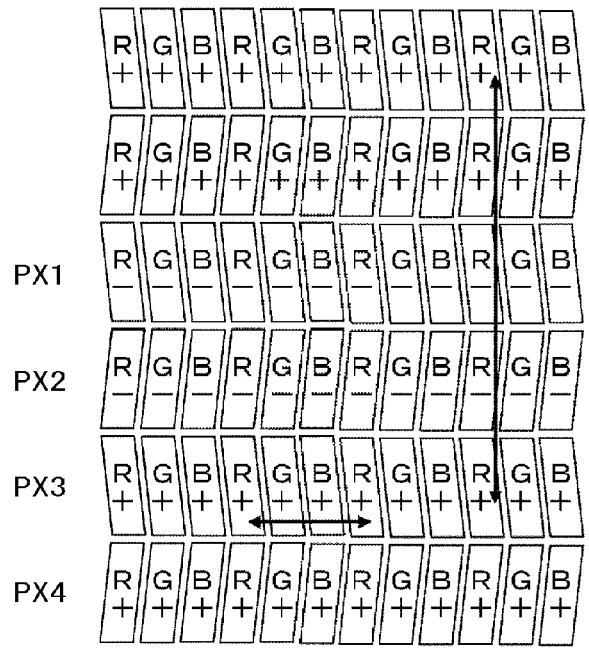
FIGS. 11A, 11B, and 11C illustrate pixel arrangements.
Figure 11B:
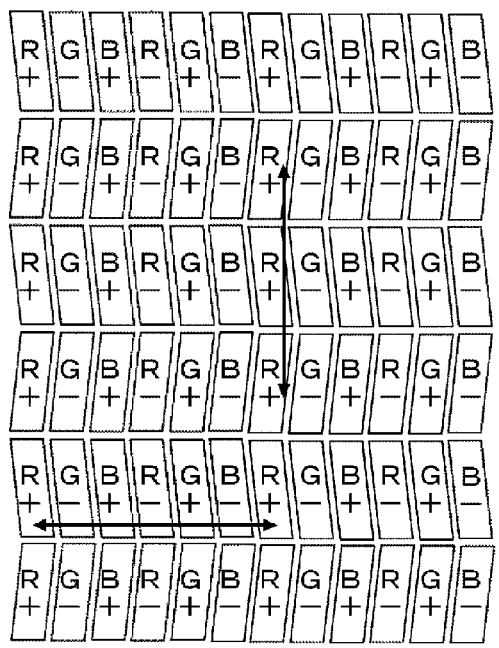
Figure 11C:
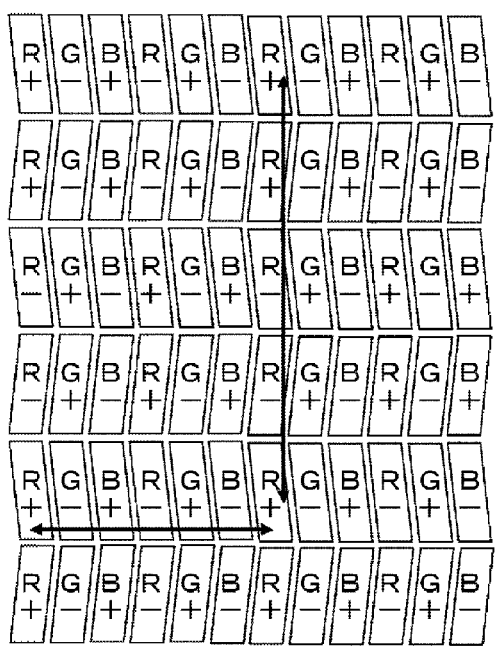

Since the LCD devices of Examples 1 and 2 include the four types of pixels, differences in the viewing angle characteristics of the pixels can be perceived if the pixels are not of a high-definition type. In other words, the wider the spaces between pixels of the same type in column and row directions are, the more easily differences in the viewing angle characteristics of pixels can be perceived. FIGS. 11A, 11B, and 11C illustrate pixels classified in accordance with the alignment status of LC molecules LCM at the time of voltage application and with the colors of the color filter CF, the classification based on the colors being added to consider pure color representation on the screen. In the figures, the letters R, G, and B represent the colors of the color filter CF while the + and − signs represent the rising directions of the LC molecules LCM. Further, the pixel shapes represent the alignment directions of the LC molecules LCM at the time of voltage application. Specifically, those parallelogram-shaped pixels titled rightward are ones in which the LC molecules LCM twist counterclockwise while those parallelogram-shaped pixels tilted leftward are ones in which the LC molecules LCM twist clockwise. In FIGS. 11A through 11C, the leftward-tilted parallelograms with the sign− are the first pixels PX1; the rightward-tilted parallelograms with the sign− are the second pixels PX2; the leftward-tilted parallelograms with the sign+ are the third pixels PX3; and the rightward-tilted parallelograms with the sign+ are the fourth pixels PX4.

FIG. 11A illustrates the pixel arrangement of Example 1. When attention is paid to the third pixels PX3 having R color filters (i.e., the leftward-tilted parallelograms with the sign R+ in FIG. 11A), a column-directional arrangement interval can be represented by the vertical arrow of FIG. 11A while a row-directional arrangement interval can be represented by the horizontal arrow of FIG. 11A. The row-directional arrangement interval of pixels of the same type is three times the width of a pixel while the column-directional arrangement interval is four times the length of a pixel. Because the aspect ratio of a pixel is 3 (length):1 (width), the ratio of the column-directional arrangement interval to the row-directional arrangement interval is 12:3 when the width of a pixel is 1. As above, the column-directional arrangement interval of Example 1 is wide. This means that if the pixels are not of a high-definition type, differences in their viewing angle characteristics may be perceived especially in the column direction.

FIG. 11B illustrates the pixel arrangement of Example 2. As illustrated, the row-directional arrangement interval of the same pixels is six times the width of a pixel while the column-directional arrangement interval is twice the length of a pixel. Thus, the ratio of the column-directional arrangement interval to the row-directional arrangement interval is 6:6. Accordingly, the column-directional arrangement interval and the row-directional arrangement interval of Example 2 are narrower than those of Example 1 in which the column-directional arrangement interval is twelve times the width of a pixel. Therefore, the LCD device 2 of Example 2 is advantageous in that differences in the viewing angle characteristics of the pixels are not perceived easily.

In addition to FIGS. 11A and 11B, FIG. 11C also illustrates another possible pixel arrangement in which pixels having different rising directions of the LC molecules alternate in both the column direction and the row direction. In this case, however, the ratio of the column-directional arrangement interval to the row-directional arrangement interval is 12:6, a combination of the maximum values of FIGS. 11A and 11B. Thus, if the pixels are not of a high-definition type, differences in their viewing angle characteristics may be perceived more easily both in the column direction and the row direction.

While we have described the invention in detail on the basis of the embodiments and examples, it is apparent that the invention is not limited to the embodiments and Examples disclosed, but can be modified in various forms.

What is claimed is:

1. A liquid crystal display device comprising:
   a first pixel having long and short sides and being polygon-shaped in plan view;
   a second pixel having long and short sides and being polygon-shaped in plan view;
   a third pixel having long and short sides and being polygon-shaped in plan view;
   a fourth pixel having long and short sides and being polygon-shaped in plan view; and
   an alignment film of a TFT substrate,
   wherein a liquid crystal molecule within the third pixel twists clockwise and rises in a plus direction,
   wherein a liquid crystal molecule within the first pixel twists clockwise and rises in a minus direction,
   wherein a liquid crystal molecule within the fourth pixel twists counterclockwise and rises in the plus direction,
   wherein a liquid crystal molecule within the second pixel twists counterclockwise and rises in the minus direction, and wherein pixels of a same type are arranged such that their long sides are adjacent to one another,
   wherein the first pixel and the second pixel are arranged such that their short sides are adjacent to one another,
   wherein the second pixel and the third pixels are arranged such that their short sides are adjacent to one another,
   wherein the third pixel and the fourth pixel are arranged such that their short sides are adjacent to one another,
   wherein the fourth pixel and the first pixel are arranged such that their short sides are adjacent to one another,
   wherein the first pixel, the second pixel, the third pixel, and the fourth pixel each include a source electrode, and
   wherein the alignment film has a first area covering the first pixel, a second area covering the second pixel, a third area covering the third pixel, and a fourth area covering the forth pixel, and an alignment treatment direction of the alignment film is common to the first area, the second area, the third area, and the fourth area.

2. The liquid crystal display device according to claim 1, wherein the first pixel, the second pixel, the third pixel, and the fourth pixel each include: a source electrode; a common electrode; and two opposing wall structures disposed along a pixel boundary,
   wherein a data line electrically connects the source electrodes of the first to fourth pixels, the data line is disposed along the pixel boundary and overlaps with one of the two wall structures,
   wherein an insulating film covers the data line,
   wherein the common electrode and the two wall structures is disposed on the insulating film,
   wherein an overcoat covers the common electrode and one of the two wall structures, and
   wherein the source electrodes of the first to fourth pixels are formed on the overcoat and face a wall surface of the one of the two wall structures.

3. The liquid crystal display device according to claim 2, wherein the first pixel, the second pixel, the third pixel, and the fourth pixel each have the common electrode formed on both wall surfaces of the respective two wall structures.

4. The liquid crystal display device according to claim 3, wherein the wall structures of the first pixel, the second pixel, the third pixel, and the fourth pixel each include a portion extending along a long side of a pixel and another portion extending along a short side of the pixel.

5. The liquid crystal display device according to claim 1, wherein the long sides of the first pixel, the second pixel, the third pixel, and the fourth pixel extend at a particular angle with respect to the alignment treatment direction.

6. The liquid crystal display device according to claim 5, wherein the particular angle is larger than 0 degrees but smaller than 10 degrees.

7. A liquid crystal display device comprising:
   a first pixel having long and short sides and being polygon-shaped in plan view;
   a second pixel having long and short sides and being polygon-shaped in plan view;
   a third pixel having long and short sides and being polygon-shaped in plan view;
   a fourth pixel having long and short sides and being polygon-shaped in plan view; and
   an alignment film of a TFT substrate,
   wherein a liquid crystal molecule within the third pixel twists clockwise and rises in a plus direction,
   wherein a liquid crystal molecule within the first pixel twists clockwise and rises in a minus direction,
   wherein a liquid crystal molecule within the fourth pixel twists counterclockwise and rises in the plus direction,
   wherein a liquid crystal molecule within the second pixel twists counterclockwise and rises in the minus direction,
   wherein the first pixel and the third pixel are arranged such that their long sides are adjacent to each other,
   wherein the second pixel and the fourth pixel are arranged such that their long sides are adjacent to each other,
   wherein the first pixel and the second pixel are arranged such that their short sides are adjacent to one another,
   wherein the third pixel and the fourth pixel are arranged such that their short sides are adjacent to one another,
   wherein the first pixel, the second pixel, the third pixel, and the fourth pixel each include a source electrode, and
   wherein the alignment film has a first area covering the first pixel, a second area covering the second pixel, a third area covering the third pixel, and a fourth area covering the forth pixel, and an alignment treatment direction of the alignment film is common to the first area, the second area, the third area, and the fourth area.

8. The liquid crystal display device according to claim 7, wherein the first pixel, the second pixel, the third pixel, and the fourth pixel each include: a source electrode; a common electrode; and two opposing wall structures disposed along a pixel boundary,
   wherein a first data line electrically connects the source electrodes of the first and second pixels, the first data line is disposed along the pixel boundary and overlaps with one of the two wall structures,
   wherein a second data line electrically connects the source electrodes of the third and fourth pixels, the second data line is disposed along the pixel boundary and overlaps with one of the two wall structures,
   wherein an insulating film covers the first data line and the second data line,
   wherein the common electrode and the two wall structures are disposed on the insulating film, wherein an overcoat covers the common electrode and the two wall structures, wherein the source electrodes of the first to fourth pixels are formed on the overcoat, wherein the source electrodes of the first and second pixels face a first wall surface of one of the two wall structures, and wherein the source electrodes of the third and fourth pixels face a second wall surface of one of the two wall structures.

9. The liquid crystal display device according to claim 8, wherein the first pixel, the second pixel, the third pixel, and the fourth pixel each have the common electrode formed on both wall surfaces of the respective two wall structures.

10. The liquid crystal display device according to claim 9, wherein the wall structures of the first pixel, the second pixel, the third pixel, and the fourth pixel each include a portion extending along a long side of a pixel and another portion extending along a short side of the pixel.

11. The liquid crystal display device according to claim 7, wherein the long sides of the first pixel, the second pixel, the third pixel, and the fourth pixel extend at a particular angle with respect to an alignment treatment direction.

12. The liquid crystal display device according to claim 11, wherein the particular angle is larger than 0 degrees but smaller than 10 degrees.

* * * * *